United States Patent [19]
Wegler

[11] Patent Number: 5,954,046
[45] Date of Patent: Sep. 21, 1999

[54] HEATING AND VENTILATION SYSTEM FOR A BUILDING

[75] Inventor: George Wegler, Vaxholm, Sweden

[73] Assignee: Resaro AB, Vaxholm, Sweden

[21] Appl. No.: 08/737,734

[22] PCT Filed: May 19, 1995

[86] PCT No.: PCT/SE95/00569

§ 371 Date: Feb. 21, 1997

§ 102(e) Date: Feb. 21, 1997

[87] PCT Pub. No.: WO95/32397

PCT Pub. Date: Nov. 30, 1995

[30]  Foreign Application Priority Data

May 19, 1994 [SE] Sweden ................................ 9401730
Jan. 16, 1995 [SE] Sweden ................................ 9500123

[51] Int. Cl.$^6$ .................................................. F24J 2/34
[52] U.S. Cl. .................. 126/617; 126/632; 126/628; 126/620
[58] Field of Search .................................. 126/632, 628, 126/620, 617

[56]  References Cited

U.S. PATENT DOCUMENTS

| 2,206,119 | 7/1940 | Persons . | |
|---|---|---|---|
| 2,559,871 | 7/1951 | Gay | 237/1 |
| 4,195,441 | 4/1980 | Baldwin | 47/17 |
| 4,578,912 | 4/1986 | Wegler . | |
| 4,602,676 | 7/1986 | Bergeron . | |
| 4,620,398 | 11/1986 | Wallin . | |

FOREIGN PATENT DOCUMENTS

| 3801199 | 1/1991 | Germany . |
|---|---|---|
| 450135 | 6/1987 | Sweden . |
| 9220883 | 11/1992 | WIPO . |

Primary Examiner—Larry Jones
Attorney, Agent, or Firm—Jacobson, Price, Holman & Stern PLLC

[57] ABSTRACT

A system for heating and ventilating a building which includes a generally peripheral foundation element which supports the external walls of the building. Room air is heated and circulated below the floor and up through floor openings at the external wall. A barrier is connected to the foundation wall so as to span the area enclosed by the foundation wall at a level beneath the floor. Exhaust air is conducted to a region beneath the barrier for surface-enlarged contact with the underside of the barrier. The foundation element and/or the base that supports the foundation element is permeable to air along essentially its full length beneath where the foundation element connects with the barrier and exhaust air flows out through the foundation element or its supporting material while effecting an exchange of heat therewith.

9 Claims, 2 Drawing Sheets

HEATING AND VENTILATION SYSTEM FOR A BUILDING

FIELD OF THE INVENTION

The present invention relates to a system for heating and ventilating a building which includes a generally peripheral foundation wall or edge beam which supports the external walls of the building, a floor construction which defines residential floor areas in the building, a space located beneath the floor construction and contained within the foundation wall, and openings which pass through the floor construction in the proximity of the external walls of the building to enable air to pass from said underlying space to the residential areas of the building.

BACKGROUND OF THE INVENTION

A system of this kind is known, for instance, from SE-B-468 441, where the building foundations beneath the floor define a space which can be referred to generally as a miniature cellar or crawl in space. This space is thermally insulated and is sufficiently large to accommodate service equipment such as heat exchangers, water heaters, water and sewage connections, and the like. Exhaust air is ducted from the building interior to a heat exchanger in the service space and then discharged as extract air from the foundations/the building to atmosphere through an outlet duct. Ambient or outdoor air is taken as supply air through an inlet duct and passed to a heat exchanger for heat exchange with the exhaust air, from where the supply air is passed to the service space. The supply air is then passed from the service space to the residential areas in the building, through a slot which extends around the perimeter of the external walls and the floor.

One problem with known foundations of this kind is that a heat exchanger is needed for the exchange of heat between the supply and the exhaust air. Another problem is that such heat exchangers must be cleaned regularly. Yet another problem with such known systems is that the circulation of air in the residential areas/the utility areas is determined by the flow of supply and exhaust air to and from the building. A further drawback is that the service space must be given a size which will enable the space to accommodate the heat exchanger or heat exchangers and to afford room for them to be cleaned. The service space must also be heavily insulated.

SUMMARY OF THE INVENTION

An object of the invention is to provide a system which will enable the floor to be heated with the aid of relatively simple means and therewith at relatively low costs, by passing and attemperating air from the residential areas of the building through the space beneath the floor into surface enlarged contact with the underside of the floor. Another object of the invention is to provide a system which utilizes a substantial part of the energy contained by the building exhaust air without requiring the use of a true heat exchanger to this end.

Important features of the inventive system are that:

air circulating in the residential areas is attemperated and circulated into heat exchange contact with the underside of the floor over essentially the whole area of the floor;

an impervious barrier is disposed beneath the floor construction under which the circulated air flows (this floor construction may be a self-supporting floor or a ground-supported floor structure);

the barrier is connected sealingly to the building foundation elements that support the external walls of the building, such as to screen the space horizontally inwards of the foundation elements;

an exhaust air duct leads exhaust air from the residential areas down through the barrier, wherein the barrier and the ground base in the foundations define a space through which the exhaust air is driven from its exiting location in the gap in a direction towards the foundation elements, to essentially all longitudinal sections thereof;

in the region beneath where the foundation element adjoins the barrier the foundation element and/or the base supporting said foundation element is permeable to air along essentially its full length, wherewith exhaust air is able to continue to flow generally radially outwards through the gap and further through the foundation element or its supporting base while transferring heat thereto.

The exhaust air is then allowed to flow to the surrounding atmosphere. The air-permeable material may extend to the vicinity of the ground surface outside the edge beam/foundation wall.

In the case when the barrier lies on the ground inwards of the foundation wall/the edge beam and has, for instance, the form of a membrane, eg a plastic membrane, the air-permeable material (the foundation element supporting base) may extend conveniently over the whole area of the foundations, or at least over the areas in which equipment is to stand.

The exhaust air delivers its heat content to the ground underlying the foundations and also to the air-permeable material and/or to the edge beam/foundation wall, so that the heat carried by the exhaust air will have slowly been extracted therefrom before the exhaust air as extract air is conducted to the surrounding atmosphere, while at the same time the barrier has kept the exhaust air separate from the circulation air and possibly also from a service space beneath a self-supporting floor structure.

The inventive system provides a number of advantages, as will be evident to the person skilled in this art. One advantage is that after being heated, the circulating indoor air will heat the floor structure; this enables the air circulating in the residential areas to have a lower temperature while maintaining a subjective comfort level.

Another advantage is that the ventilation exhaust air delivers its heat content to the ground and to the foundation wall/edge beam, so as to reduce the heat that is lost from the circulation air to the foundation wall and to the ground beneath the building.

Another advantage is that the air in the residential areas can be circulated at a rate of flow which is generally independent of the flow rate of the supply/exhaust air. According to one preferred embodiment of the present invention the supply air can be mixed with the circulation air without the use of a heat exchanger, wherein the supply air can be controlled in a known manner so that it is not released into the residential areas until the temperature of the supply air is generally the same as that of the circulating air. For instance, the supply air can be conducted along a circulation air duct that extends through a heat exchanger and thereafter down into the surface-enlarged space beneath the floor. Alternatively, the supply air can be introduced through a large number of perforations distributed in the roof insulation and/or wall insulation of the building, such that the supply air will enter the residential areas of the building relatively slowly and therewith have time to be heated to the average temperature of the circulation air before arriving at the central parts of the residential areas.

This obviates the need of heat exchangers in the system, which not only results in a corresponding reduction in costs, but also removes the need to frequently clean the heat exchangers.

The introduction of air to the residential areas from the perimeter of the floor structure results in a favourable circulating air pattern.

The circulation of exhaust air through the foundations and therewith heating of the lower parts thereof, prevents the formation of harmful moisture contents in the building/foundation materials.

When the floor structure is a self-supporting structure, the inventive system can use a floor which is constructed from a relatively load distributing slab or plate which is carried by flexurally rigid lattice-work structures capable of receiving and supporting conduits, such as electric cable ducting, liquid carrying conduits, gas conduits and the like and therewith facilitate installation of such conduits or ducts in the building, wherein water heaters, fans, electric cable trunking etc. can be placed in a space beneath the floor. It will be understood that the free-supporting floor may have some other conventional construction, for instance a reinforced concrete slab construction, in which case the conduits are attached to the underside of the floor with the aid of conventional fasteners. The barrier may be placed on the sub-surface in said space and may optionally be covered with a protective layer to prevent damage when walked on. The service equipment may therewith be placed on top of the membrane and the circulation air allowed to flow through the bottom space which is downwardly delimited by the membrane. Alternatively, the membrane may be mounted on the underside of the flexurally rigid structures after having installed the cables, ducts and conduits, wherewith the barrier may have the form of sheets of plaster board, plywood, air-impervious insulating board or like materials.

It will be readily understood that in principle the air-permeable material should be placed solely beneath the junction of the barrier with the edge beam/foundation wall.

The air-permeable material can then have the form of a gravel bed or a bed of like material beneath the foundation wall/the edge beam. Alternatively, or in addition, the edge beam/foundation wall itself may be made air permeable in the sub-barrier region thereof. For instance, the sub-region of the edge beam/foundation wall may be provided with a plurality of perforations configured to effect the transfer of heat with the mass of the edge beam/foundation wall. However, it is also advantageous to provide a layer of air conducting material, such as a gravel bed, in those parts of the foundations at which the barrier lies against its underlying supporting surface.

In the aforegoing the invention has been described with reference to winter conditions, in which heat is delivered to the building with the intention of lowering heating costs. The inventive system also has benefits in the summer season when wishing to keep the building cool, by enabling the circulating air to be cooled. In this case, the floor surface is cooled so as to give a subjective impression that the floor temperature is lower than the actual air temperature in the residential areas.

The invention will now be described with reference to exemplifying embodiments thereof and with reference to the accompanying drawings, in which FIG. 1 is schematic cross-sectional view of a building equipped with an inventive system;

Figure 1:
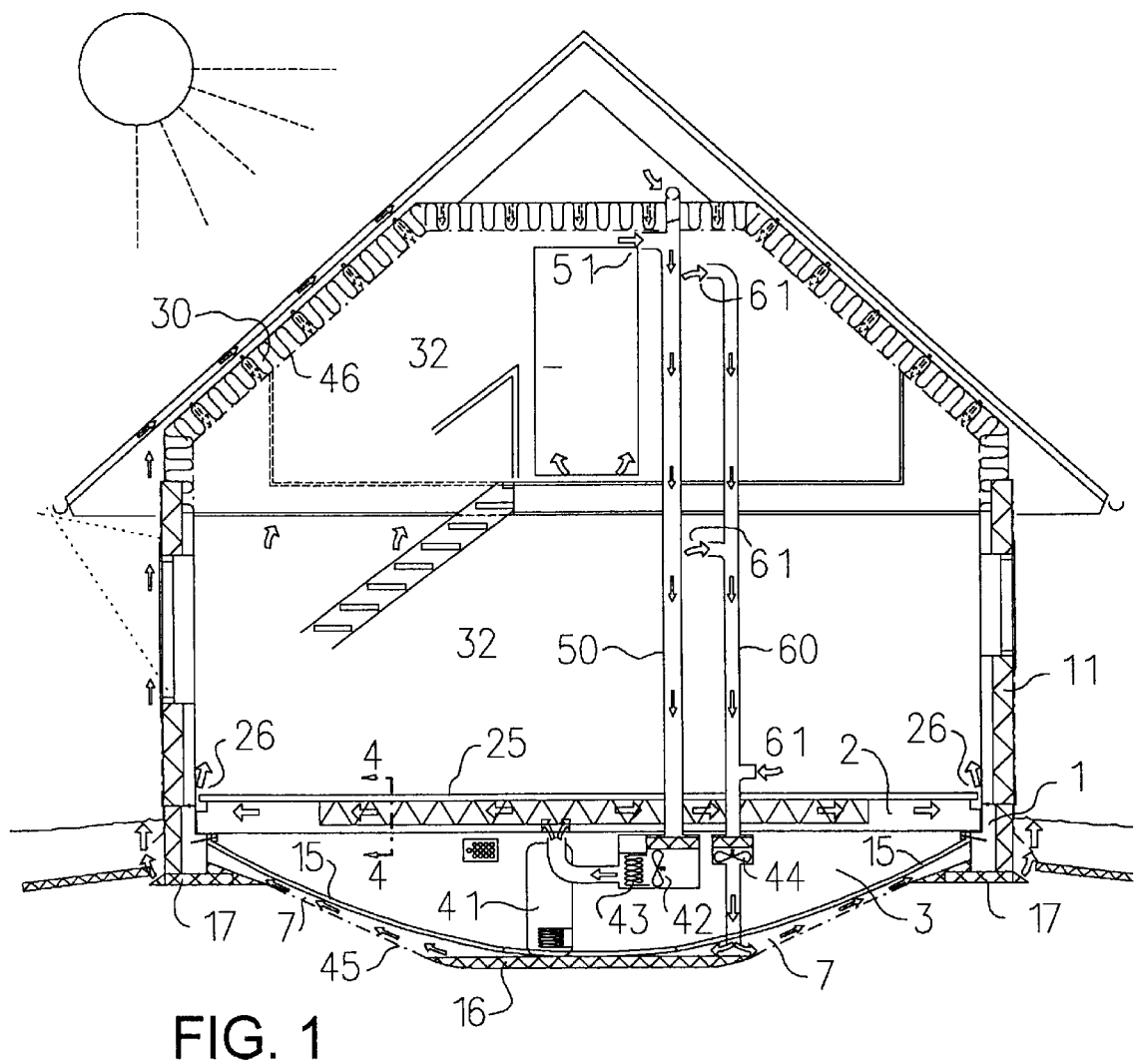
Figure 4:
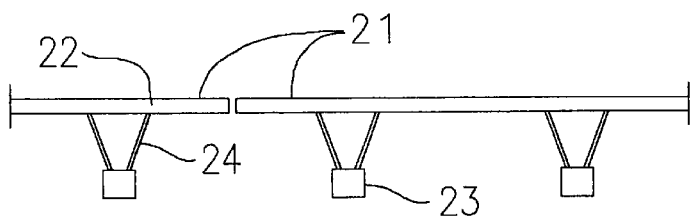
FIG. 4 is a schematic part-sectioned view taken on the line IV—IV in FIG. 1.

Referring to FIGS. 1 and 4, there is shown a building which has a generally closed ring-like foundation 1 that supports a structural 2 comprised of floor elements 21 (see FIG. 4). Each of the floor elements 21 has a surface-enlarged top flange 22, a much narrower bottom beam element 23 and a flexurally rigid latticework construction 24 which connects the top flange 22 with the bottom beam element 23. The flanges 22 define a sub-floor structure 25. An air gap 26 is provided between the sub-floor 25 and the foundation wall 1 or the external walls 11 of the building, said gap extending essentially along the full length of said walls.

As illustrated, the roof insulation 30 is of a known porous kind and ambient air is able to seep relatively slowly into the building interior and into the residential or living areas 32 of the building as supply air, due to sub-pressure conditions prevailing in the building. The insulation 30 may be provided with an air-permeable pressure-equalizing layer, for instance a layer of fabric, which offers a resistance such as to cause the air to be distributed generally uniformly across the insulated area. Located beneath the sub-floor 25 is a service space or utilities space 3 whose bottom defining surface is delimited by an impervious barrier 15, in the illustrated case a membrane, eg made of flexible plastic sheet, wherein the edges of the barrier are sealingly connected to the foundation wall 1 around the perimeter thereof and beneath the base floor structure 2. The barrier may have a heat-insulating character and may, for instance, be comprised of a sheet of impervious flexible expanded plastic or cellular plastic. The space 3 accommodates a water heater 41, a fan unit 42 and a fan unit 44.

A circulation air duct 50 draws in air from the residential areas 32 and conducts the air to the fan unit 42 installed in the utilities space 3, wherein the circulation air may optionally be heated in heating unit 43 prior to be brought into contact with the underside of the floor structure 25, where the air can disperse in surface-enlarged contact with the sub-floor 25 to the gap 26 while heating the surface of the floor 25 (floor heating). The air exiting from the gap 26 rises in the residential areas 32 and is recirculated through the openings in the duct 50.

Exhaust air is evacuated from toilet, bathroom and kitchen facilities through an exhaust air duct 60, which conducts the air to a fan unit 44. The fan unit 44 may optionally be fitted with a typical filter unit and functions to lead the exhaust air through the impervious barrier 15 and to the central space 7 between the membrane 15 and the ground. In order to enlarge the specific area of contact of the exhaust air/supply air with those parts of the foundations at which the barrier 15 lies against the floor of the space 3. In these locations, the space floor may be comprised of a layer of air-permeable material, such as a layer of gravel or like material. Similar gravel beds may be placed beneath the foundation walls 11 to establish a means of communication of the exhaust air with the outdoor surroundings, in a direction out from the intermediate space 7 and beneath the walls 1.

It will be seen from FIGS. 1 and 4 that the flow rate of exhaust air can be made selectively independent of the rates of flow of circulation air in the residential areas of the building and through the utilities or service space 3.

Figure 2:
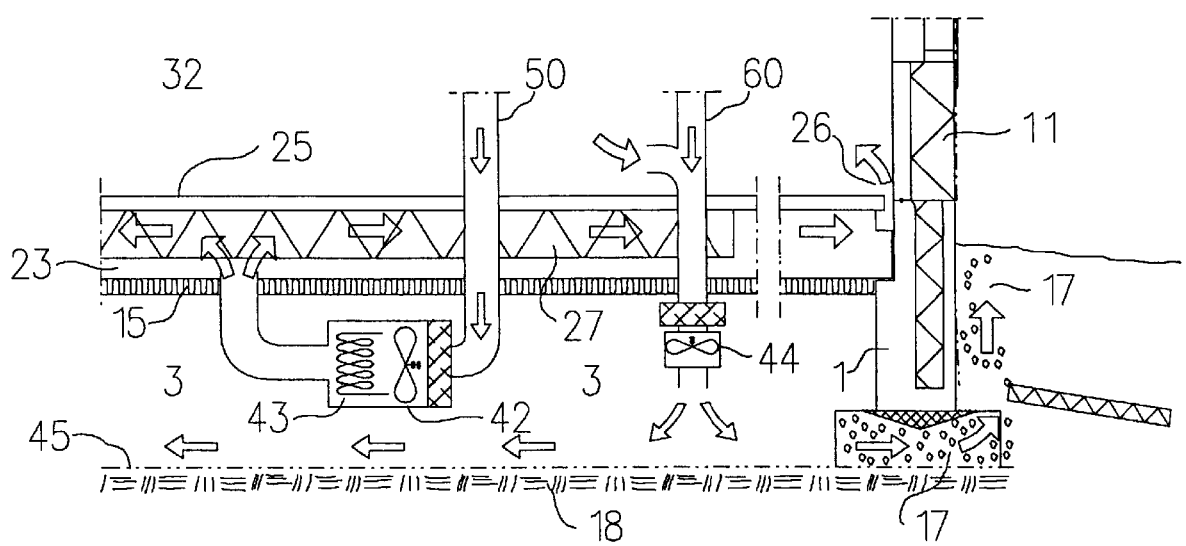
FIG. 2 illustrates schematically an alternative positioning of the membrane in a building of the kind shown in FIG. 1.

FIG. 2 shows a variant of the inventive system in which the barrier is mounted on the underside of the structural floor 2, to form a floor space 27 whose vertical extension or depth corresponds essentially to the vertical extension of the floor elements 21 minus the thickness of the upper flange, therewith to disperse the recirculating air through the floor structure. In this embodiment, the barrier 15 may conveniently comprise panel elements, such as sheets of plaster board, plywood, or thermally insulating and air-impervious material, attached to the beam elements 23. Exhaust air can now be dispersed freely across the cross-sectional area of the foundations, wherein exhaust air/supply air can be led out through an air-conducting porous layer/bed 17 which holds the foundation wall spaced from the ground surface 18. Those parts of the foundation wall 1 that are located actually beneath the barrier 15 may also in this case be permeable to air.

Figure 3:
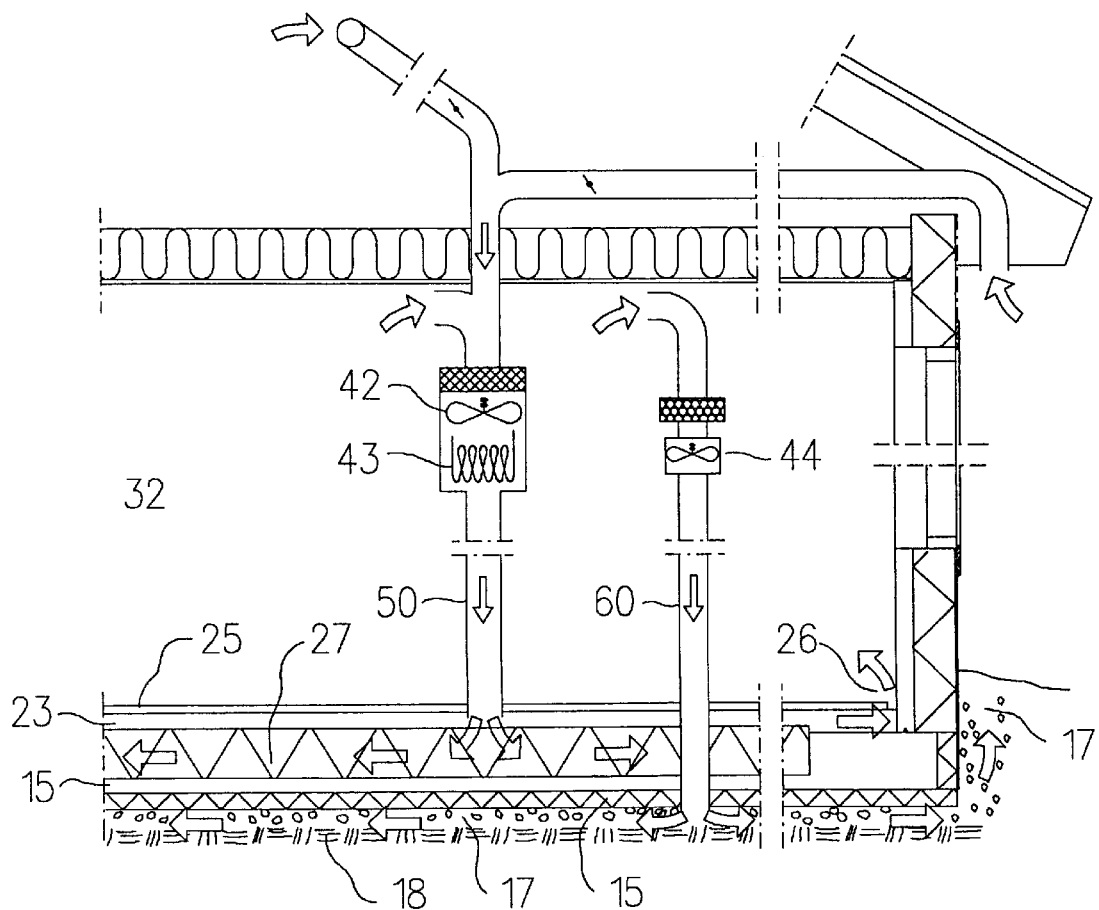
FIG. 3 shows schematically positioning of the membrane in a building in which the floor structure rests directly on the ground.

In the embodiment shown in FIG. 3, the sub-floor 25 is placed directly on the ground 18, via the preferably thermally insulating barrier 15 and a layer of bed of air-permeable material 17 (a gravel bed or like bed), therewith establishing a circulation-air distributing channelway 27 in the structural floor 2, the fan unit 42 for recirculated air also being placed in the residential area 32 of the building. The exhaust air fan unit 44 is also placed in the residential area 32. The barrier 15 may, eg, be formed by the bottom plate, the insulating layer and/or an impervious plastic sheet.

As will be seen from FIG. 3, supply air can be taken into the building in a conventional manner through a duct system which communicates with the surroundings, said supply air primarily being conducted into the circulation-air system and to the fan unit, from where the air is passed through the air heater and then through the floor structure prior to being dispersed in the residential areas 32.

As will be evident from FIG. 1, when practicing the invention only two ducts or channels 50, 60 need pass through the sub-floor 25.

All of the embodiments shown in respective FIGS. 1, 2 and 3 includes an impervious barrier 15 which functions to screen the full area of the foundations beneath the base floor structure, such that the barrier 15 delimits downwardly a circulation space for the air mass in the residential areas of the building, wherein the circulation air can be caused to heat or warm a floor. The barrier 15 defines upwardly a space which receives exhaust air from the building, said exhaust air being intended to disperse or spread in the pressurized space defined between the barrier 15 and the foundation wall supportive layer and to pass therefrom through an air-permeable supportive layer beneath the foundation walls (or through perforations in the foundation walls beneath the barrier) to the building surroundings.

As shown in FIGS. 1 and 2, an impervious plastic sheet may be placed on the ground 18 as protection against the ingress of moisture and radon gas, particularly when the floor structure is a self-supporting structure.

One advantage afforded by the present invention is that in hot weather the building can be cooled by coupling a cooling source to the circulation-air duct 50, for instance the evaporator of a heat pump.

Another advantage afforded by the inventive system is that with the aid of relatively simple means the residential or living areas of the building can be cooled in summer months by discharging exhaust air 60 direct to the outdoor surroundings (instead of passing the air down beneath the barrier 15) and by passing outside ambient air through the layer 17, the perforated foundation walls 1 and optionally also the layer 16 so as to cool the air, and thereafter to the residential areas of the building, with the aid of suitable fans, blowers and air ducts. The modification that is required in order to adapt the system to an air cooling mode in summertime, by heat exchange with ground-cool masses, will be obvious to the person skilled in this art. For instance, as shown in FIG. 3, this modification may include the provision of a branch connecting pipe in the duct 50 immediately upstream of the fan unit 42, and the provision of a switching valve downstream of the outlet of the air duct 60 to the fan unit 44, and the provision of a duct from the valve directly to the surrounding outdoor atmosphere.

I claim:

1. A system for heating and ventilating a building, said system comprising:

a generally peripheral foundation element supporting external walls of the building, a sub-floor structure defining a floor surface of residential areas in the building, an open space located beneath the sub-floor structure and adjacent the foundation element, and air-throughflow openings passing through an air gap defined between the sub-floor structure and the external walls of the building, a barrier connected to the foundation element so as to span the open space enclosed by the foundation element at a level beneath the sub-floor structure, duct work for conducting building exhaust air to a region beneath the barrier, the foundation element in a region beneath where the foundation element connects with the barrier being permeable to air so that exhaust air is able to flow out as extract air by the foundation element, and air circulating means with an air attemperating device for circulating air from the residential areas of the building into the open space beneath the sub-floor structure and above the barrier to attemperate an underside of the sub-floor across essentially the whole area of the floor and to attemperate the circulation air prior to passing the air to beneath the sub-floor and releasing the attemperated air through the air gap.

2. A system according to claim 1, wherein the barrier is located above said air attemperating device.

3. A system according to claim 2, wherein the exhaust air passes beneath the barrier.

4. A system according to claim 2, wherein the open space is a service space for accommodating service equipment.

5. A system according to claim 1, wherein the air-permeable region is a gravel bed extending across at least a part of an area of a supportive surface located inwardly of the foundation element.

6. A system according to claim 5, wherein the sub-floor structure is self-supporting and the barrier lies essentially on a bottom of the open space.

7. A system according to claim 1, wherein outdoor air introduced into the building is heated and mixed with temperated indoor air from the residential areas of the building.

8. A system according to claim 1, wherein the attemperating device heats circulation air.

9. A system according to claim 1, wherein the attemperating device cools circulation air.

* * * * *